United States Patent [19]

Staver

[11] 4,437,502

[45] Mar. 20, 1984

[54] TRAILER MOUNTED LOG SPLITTER

[76] Inventor: Paul L. Staver, Box 74, Meriden, Iowa 51037

[21] Appl. No.: 455,216

[22] Filed: Jan. 3, 1983

[51] Int. Cl.$^3$ .......................... B27L 7/00; A47J 49/02

[52] U.S. Cl. ................................ 144/193 A; 144/3 K

[58] Field of Search .............. 144/3 K, 193 R, 193 A; 298/22 F; 296/184; 414/467, 473

[56] References Cited

U.S. PATENT DOCUMENTS

| | | | |
|---|---|---|---|
| 3,242,955 | 3/1966 | Hellstrom | 144/193 A |
| 3,280,864 | 7/1964 | Spanenberg | 144/193 A |
| 4,076,062 | 2/1978 | Kanik | 144/193 A |
| 4,141,396 | 2/1979 | McCallister | 144/193 A |
| 4,176,696 | 12/1979 | Greeninger | 144/3 K |
| 4,269,242 | 5/1981 | Smith et al. | 144/3 K |

*Primary Examiner*—Francis S. Husar
*Assistant Examiner*—Jorji M. Griffin
*Attorney, Agent, or Firm*—David C. Larson

[57] ABSTRACT

A trailer mounted log splitter which operates as a log splitter and as a trailer with hauling and dumping capabilities is provided. The preferred embodiment is a single unit that can be transported to a wooded area, used to split wood and then transport the wood to a firewood storage area and unload the split wood with a minimum of supplemental equipment and handling.

17 Claims, 2 Drawing Figures

TRAILER MOUNTED LOG SPLITTER

BACKGROUND OF THE INVENTION

The present invention relates generally to log splitting devices and more particularly to a mobile log splitter with splitting, hauling and unloading functions performed by a single piece of equipment.

Those concerned with the harvesting and preparing of timber for use in domestic fireplaces and woodburning stoves have long been acquainted with the problems encountered in efficiently processing and delivering standing trees from a harvest area to a storage area. A particular problem is the amount of equipment and time necessary to split, load, transport and unload the firewood. Typically, trees are felled and cut into various lengths at a wooded area, then loaded and transported back to a location where they are manually unloaded and split. The split logs are then reloaded, transported to a storage area and manually unloaded a second time. This process requires the use of hauling equipment, splitting equipment and substantial manpower.

In the past, log splitters have been developed which are mobile and can be hauled to the harvest area in order for the cutting and splitting to take place in one location. Although, in general, these devices have performed the log-splitting function satisfactorily, they have always required supplemental transporting equipment such as a truck or car and trailer. For the typical domestic user or small-scale entreprenuer, the cost and time involved in cutting splitting, hauling and unloading firewood quickly begins to outweight the advantages of utilizing the abundant and inexpensive fuel source. Additionally, the required supplemental hauling equipment has always required manual unloading which increases the time and expense involved.

The use of wood as an alternative energy source has increased rapidly in recent years, especially in the domestic context for supplemental or even primary space heating. Large-scale commercial processors have taken advantage of the increased market for firewood and have been reaping the profits of this new industry by mass producing and thereby keeping unit prices competitive. Even though trees are available for harvest on an individual basis, domestic users and small-scale entrepreneurs have been unable to economically harvest the resource due to the cost of the required pieces of equipment and time involved, with the result being that they are placed at the mercy of the large-scale producers.

The domestic user and small-scale entrepreneur have a need for equipment that provides an inexpensive and efficient means for harvesting firewood, but to date, the equipment available is too expensive and requires too much time to be economical.

SUMMARY OF THE INVENTION

Accordingly, the present invention provides a single unti device for splitting, transporting and unloading firewood allowing the operator to prepare firewood for domestic use with a minimum of manpower and expense.

An object of the present invention is to provide a highly mobile, single-unit, multi-purpose device for processing firewood.

Another object is to provide an inexpensive device for processing firewood which minimizes the need for supplemental equipment and manpower.

A further object of the invention is to provide a log-splitter/trailer which utilizes the power mechanism of a log-splitter to unload the firewood after transport.

Still another object is to provide a log-splitter/trailer which utilizes parts of the trailer as a hydraulic fluid reservoir.

Yet another object is to provide a log-splitter/trailer which allows for easy cleaning and maintenance.

Other objects, advantages and novel features of the present invention will become apparent from the following detailed description of the invention when considered in conjunction with the accompanying drawings.

BRIEF DESCRIPTIONS OF THE DRAWINGS

DESCRIPTION OF THE PREFERRED EMBODIMENT

Figure 1:
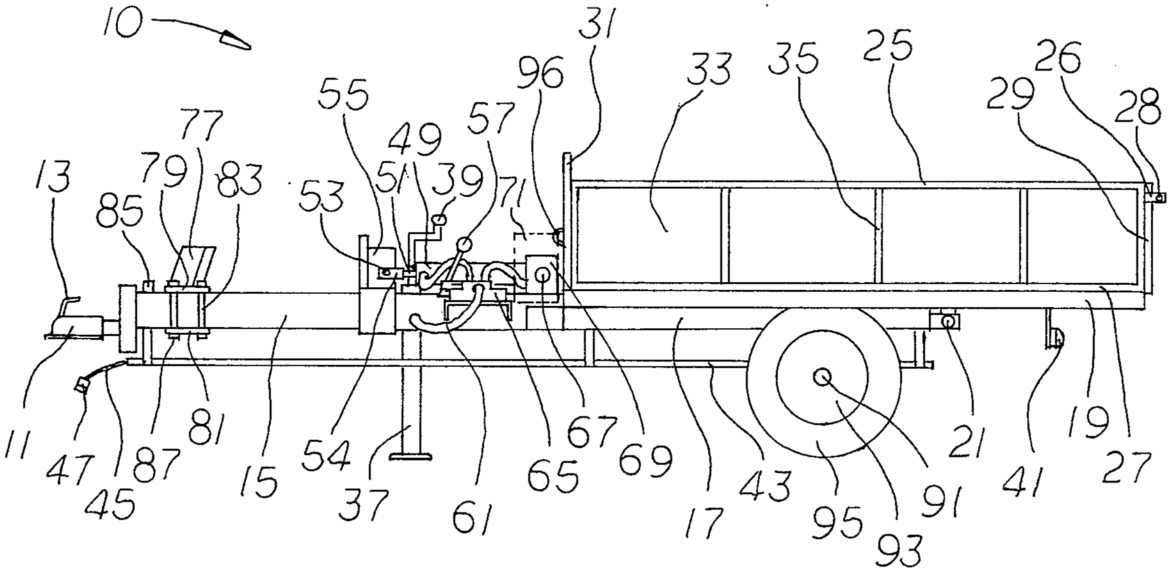
FIG. 1 is a side elevation view of the trailer mounted log splitter of the present invention, showing the trailer mounted log splitter in the splitting mode.

Referring now to the drawings wherein like reference numerals designate identical or corresponding parts throughout the several views, FIG. 1 shows the trailer mounted log splitter of the present invention indicated generally at 10. The trailer mounted log splitter 10 includes a trailer hitch 11 and a trailer hitch lock 13 attached to a trailer tongue 15 with the trailer tongue 15 being hollow and thereby also serving as the hydraulic fluid reservoir for the trailer mounted log splitter 10.

Figure 2:
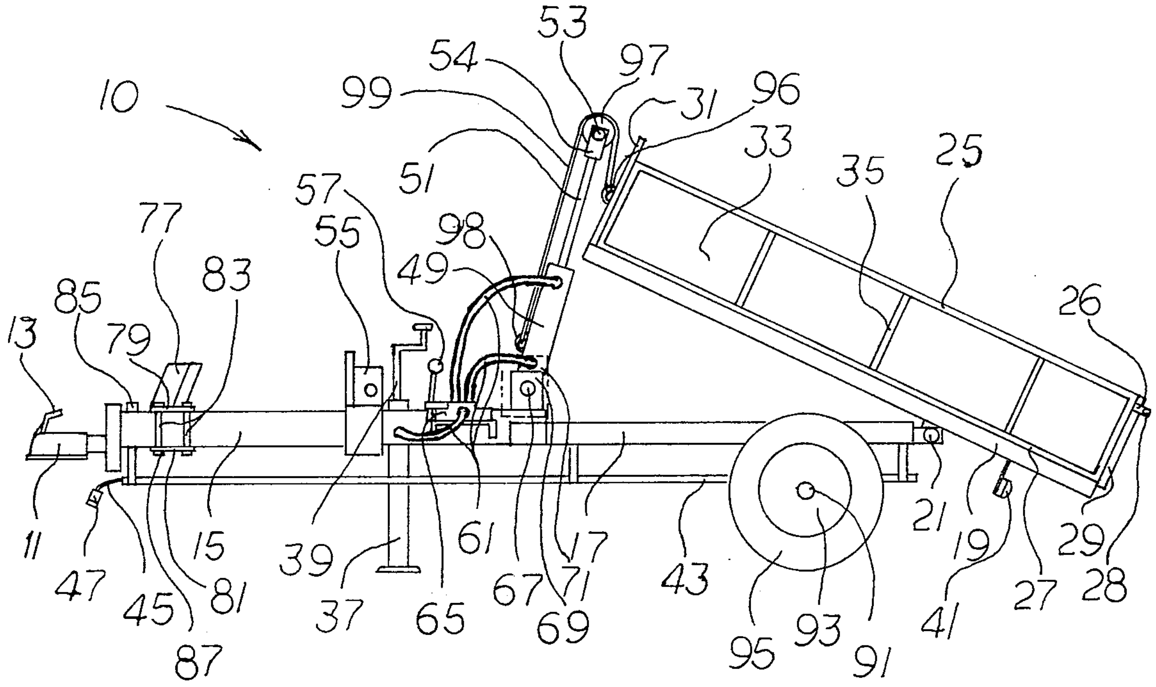
FIG. 2 is a side elevation view showing the trailer mounted log splitter in the bed tilt mode.

A trailer frame 17 is rigidly attached at the forward end to the trailer tongue 15 and attached at the rear end to a trailer box bottom frame 19 at trailer box pivot 21. The trailer box pivot 21 is located approximately two-thirds of the way back from the front of the trailer box bottom frame 19 in order to allow for the lifting and dumping of the contents of a trailer box 33 as can best be seen in FIG. 2.

When in use, the trailer mounted log splitter 10 is maintained in a horizontal position either by leaving the trailer hitch 11 attached to a vehicle or by supporting the trailer tongue 15 through the use of a retractible trailer tongue support 37 which is attached to the side of the trailer tongue 15 and raised or lowered by a support crank 39.

Centrally attached to the bottom side of the trailer tongue 15 and trailer frame 17 is a conduit 43 which runs the length of the trailer mounted log splitter 10 and encloses an electric line 45 which transfers power to tail lights 41 when the female connector 47 is plugged into a pulling vehicle's light system.

Attached to the top side of the trailer box bottom frame 19 is a trailer bed 27. The trailer bed 27 is made of a rigid wire mesh which allows small chips of wood and sawdust to fall through the trailer bed to the ground. Attached to the perimeter of the trailer box bottom frame 19 at various points along the side and front is a trailer box side frame 35 and a trailer box front frame 31 which is taller than the corresponding trailer box side frame 35. The trailer box side frame 35 is completed by attaching a trailer box top frame 25 across the top of the trailer box side frame 35 with the trailer box front frame 31 being completed in a similar manner. The trailer box sides (not shown) are made of the same rigid wire mesh as the trailer bed 27 and are attached to the inside of the trailer box side frame 35 and trailer box front frame 31 to complete the trailer box 33. A trailer box back panel 29 made of the same frame and mesh material as the trailer box side 33 and front 31 is removably attached to the rear of the trailer box 33 by means such as an "L" shaped rod (not shown) attached to the bottom side of the trailer box back panel 29 being inserted into a hollow pipe (not shown) attached to the trailer box bottom frame 19 at a cooperative location. It is understood that any removable hinge means which are common in the art can be used. Clevises 26 are attached to the top of trailer box side frame 35 in a position to receive the frame of the trailer box back panel 29 thereby allowing the trailer box back panel 29 to be locked into a closed position by inserting rods 28 into the clevises 26. When the rods 28 are removed, the trailer box back panel 29 can be rotated into an open posture or removed as was more fully discussed above.

A hydraulic cylinder 49 is pivotally attached at its rear end to the trailer tongue 15 by inserting a connecting pin 67 through an aperture in a clevis 69 attached to the trailer tongue 15. A piston shaft 51 which is a prt of the hydraulic cylinder 49 is removably attached to a ram element 55 by inserting a connecting pin 53 through an aperture in the ram element 55 and through a clevis 54 that is welded to the hydraulic ram 51. As will be discussed more fully hereinafter, the piston shaft 51 can be disconnected from the ram element 55 and pivoted to an upright position for use in lifting the trailer box 33 as can best be seen in FIG. 2.

The hydraulic cylinder 49 operates by conventional means with hydraulic lines 61 attached to a pump (not shown) powered by an internal combustion motor 71 (shown in outline) and regulated by a control box 65. The control box 65 is attached to the trailer tongue 15 and regulates the direction and pressure of hydraulic fluid through the hydraulic cylinder 49 by manual operation of a control lever 57.

The trailer mounted log splitter 10 operates in a splitting mode (FIG. 1) by the ram element 55 moving a log (not shown) into contact with and past a splitting wedge 77 which is vertically disposed and directed toward the ram element 55. A friction plate 79 attached to the bottom of the splitting wedge 77 is held in place on the trailer tongue 15 by bolts 83 extending downward through bolt holes in the friction place 79 and secured through bolt holes in a lower friction plate 81 by nuts 87. The splitting wedge 77 is further prevented from slipping by a stop 85 welded to the trailer tongue 15 immediately behind the friction plate 79. The friction means of holding the splitting wedge 77 is place allows for easy horizontal adjustment of the splitting wedge 77 as well as for easy removal and repair.

The trailer mounted log splitter 10 also operates in a bed tilt mode (FIG. 2) by pivoting the hydraulic cylinder 49 to an upright position. The pivoting of the hydraulic cylinder 49 is accomplished by removing the connecting pin 53 and manually pivoting the hydraulic cylinder 49 into a vertical position. Once the hydraulic cylinder 49 is in a vertical position, a pully 97 is mounted on the end of the piston shaft 51 by inserting the connecting pin 53 back through the clevis 54 and through an aperture in the center of the pully 97.

A cable 99 is attached at one end to a closed hook 96 located on the trailer box 33 and at the other end to a closed hook 98 located on the hydraulic cylinder 49. To operate in the bed tilt mode (FIG. 2), the cable 99 is threaded over the pully 97. As the piston shaft 51 is telescoped upward, the cable 99 is placed in tension causing the trailer box 33 to tilt upward for the dumping of its contents as can best be seen in FIG. 2. The tension in the cable 99 also serves to position the hydraulic cylinder 49 into ideal lifting postures throughout the lift due to the hydraulic cylinder 49 being free to pivot about the connecting pin 67.

The trailer mounted log splitter 10 is movably supported on tires 95 mounted on rims 93 which are rotatively attached to axle 91. The axle 91 is operatively connected to the trailer frame 17 by means such as axle hangers (not shown) to allow mobility.

I claim:

1. A trailer mounted log splitter comprising:

trailer means;

log-splitting means attached to the tongue portion of said trailer means;

trailer box means pivotally attached to said trailer means; and means for operatively connecting said log-splitting means to said trailer box means for pivoting said trailer box means between raised and lowered positions.

2. A trailer mounted log splitter as recited in claim 1 wherein said trailer means comprises:

an elongated trailer tongue;

a trailer frame rigidly attached to the rear end of said elongated trailer tongue; and wheel means rotatively attached to the bottom side of said trailer frame.

3. A trailer mounted log-splitter as recited in claim 2 wherein said log-splitting means comprises:

a splitting wedge removably attached to said elongated trailer tongue;

a ram element slidably mounted on said elongated trailer tongue; and hydraulic cylinder means pivotally attached to said elongated trailer tongue and removably connected to said ram element.

4. A trailer mounted log-splitter as recited in claim 3 wherein said trailer box means comprises:

a trailer bed;

trailer box side panels attached to said trailer bed around the perimeter and extending upward therefrom on the front, left and right;

a trailer box back panel pivotally and removably attached to the rear of said trailer bed; and latch means for locking said trailer box back panel in a closed position.

5. A trailer mounted log-splitter as recited in claim 4 wherein said trailer bed, trailer box side panels and trailer box back panel consist of wire mesh attached to a frame structure.

6. A trailer mounted log-splitter as recited in claim 3 wherein the means for operatively connecting said log-splitting means to said trailer box means comprises:

a pully removably and rotatively attached to said hydraulic cylinder means at the same location where said ram element removably connects to said hydraulic cylinder means; and a cable attached at one end to the side of said hydraulic cylinder means, threaded over said pully and attached at the other end to the front end of said trailer box means.

7. A trailer mounted log-splitter as recited in claim 4 wherein the means for operatively connecting said log-splitting means to said trailer box means comprises:

a pully removably and rotatively attached to said hydraulic means at the same location where said ram element removably connects to said hydraulic cylinder means; and a cable attached at one end to the side of said hydraulic cylinder means, threaded over said pully and attached at the other end to the front of said trailer bed.

8. A trailer mounted log-splitter as recited in claim 5 wherein the means for operatively connecting said log-splitting means to said trailer box means comprises:

a pully removably and rotatively attached to said hydraulic cylinder means at the same location where said ram element removably connects to said hydraulic cylinder means; and a cable attached at one end to the side of said hydraulic cylinder means, threaded over said pully and attached at the other end to the front of said trailer bed.

9. A trailer mounted log-splitter as recited in claim 8 wherein said elongated trailer tongue is hollow and serves as a hydraulic fluid reservoir for said hydraulic cylinder means.

10. A trailer mounted log-splitter comprising:

a trailer tongue;

a trailer frame rigidly attached to the rear of said trailer tongue;

a splitting wedge removably attached to said trailer tongue;

a ram element slideably mounted on said trailer tongue;

power transfer means removably attached to said ram element at one end and pivotally attached to said trailer tongue at the other end;

a trailer box attached to said trailer frame;

a connecting means for removably attaching said power transfer means to said trailer box; and wheel means rotatively attached to said trailer frame.

11. A trailer mounted log-splitter as recited in claim 10 wherein said trailer box is pivotally attached to said trailer frame to allow said trailer box to be rotated upward for dumping.

12. A trailer mounted log-splitter as recited in claim 11 wherein said connecting means comprises:

a pully removably and rotatively attached to said power transfer means at the same location where said ram element removably attaches to said power transfer means; and a cable attached at one end to said power transfer means, threaded over said pully and attached at the other end to the front side of said trailer box.

13. A trailer mounted log-splitter as recited in claim 12 further comprising:

a trailer box back panel removably and pivotally attached to the bottom of said trailer box at the rear end; and latch means located at the top rear of said trailer box for locking said trailer box back panel in a closed position.

14. A trailer mounted log-splitter comprising:

an elongated trailer tongue;

a trailer frame rigidly attached to the rear of said elongated trailer tongue;

a splitting wedge removably attached to the top side of said elongated trailer tongue near the forward end of said elongated trailer tongue having a wedge shaped surface pointing rearwards;

a ram element slideably mounted on said elongated trailer tongue having a generally flat surface facing toward said splitting edge;

a hydraulic cylinder removably attached to the rear side of said ram element at one end and pivotally attached near the rear end of said elongated trailer tongue at the other end;

a fluid pump for providing hydraulic fluid under pressure to said hydraulic cylinder;

a motor for supplying power to said fluid pump;

control means for regulating the pressure and direction of flow of the hydraulic fluid;

a trailer box pivotally attached to the rear end of said trailer frame at a point on the bottom side of said trailer box approximately two-thirds of the way back from the front of said trailer box;

connecting means for removably attaching one end of said hydraulic cylinder to the front of said trailer box;

a trailer box back panel removably and pivotally attached to the bottom of said trailer box at the rear end;

latch means located near the top of said trailer box at the rear end for locking said trailer box back panel in a closed position; and wheel means rotatively attached to the bottom of said trailer frame at a point approximately two-thirds of the way back from the front of said trailer frame.

15. A trailer mounted log-splitter as recited in claim 14 wherein said connecting means comprises:

a pully removably and rotatively attached at one end of said hydraulic cylinder at the same location where said ram element removably attached to said hydraulic cylinder; and a cable attached at one end to the front side of said hydraulic cylinder, threaded over said pully and attached at the other end to front side of said trailer box.

16. A trailer mounted log-splitter as recited in claim 15 wherein said elongated trailer tongue is hollow and acts as a hydraulic fluid reservoir for said fluid pump.

17. A trailer mounted log-splitter as recited in claim 16 further comprising:

a trailer tongue support means which is attached to the side of said elongated trailer tongue which maintains the trailer mounted log-splitter in a level attitude.

* * * * *